United States Patent
Agadi et al.

(10) Patent No.: US 9,599,241 B2
(45) Date of Patent: Mar. 21, 2017

(54) CLACK VALVE ASSEMBLY

(71) Applicant: AIRBUS OPERATIONS LIMITED, Bristol (GB)

(72) Inventors: Harish Agadi, Bristol (GB); Lee Randle, Bristol (GB); Michael J. James, Bristol (GB); Mark Wright, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 15 days.

(21) Appl. No.: 13/667,608

(22) Filed: Nov. 2, 2012

(65) Prior Publication Data

US 2013/0118612 A1   May 16, 2013

(30) Foreign Application Priority Data

Nov. 11, 2011   (GB) .................................. 1119491.7

(51) Int. Cl.
  *F16K 15/00*  (2006.01)
  *F16K 15/03*  (2006.01)
  *F16K 17/12*  (2006.01)

(52) U.S. Cl.
  CPC .............. *F16K 15/03* (2013.01); *F16K 17/12* (2013.01); *Y10T 137/0497* (2015.04); *Y10T 137/7903* (2015.04)

(58) Field of Classification Search
  CPC ..... F16K 15/03; B64D 37/005; Y10T 137/79; Y10T 137/7902; Y10T 137/7903
  USPC .......................... 137/527, 527.2, 527.6, 527.8
  See application file for complete search history.

(56) References Cited

U.S. PATENT DOCUMENTS

| 556,636 | A | * | 3/1896 | Kuichling | 137/527.2 |
| 705,255 | A | * | 7/1902 | Leidecker | F16K 15/033 137/515 |
| 1,399,684 | A | * | 12/1921 | Belcher | 137/527 |
| 1,668,456 | A | * | 5/1928 | Jennings | 137/454.2 |
| 1,982,189 | A | * | 11/1934 | Anderson | 137/527.2 |

(Continued)

FOREIGN PATENT DOCUMENTS

| EP | 1 479 554 A1 | 11/2004 |
| EP | 1922503 A2 | 5/2008 |

(Continued)

OTHER PUBLICATIONS

"Integral", Merriam-Webster. Jan. 23, 2015.*

(Continued)

*Primary Examiner* — R. K. Arundale
(74) *Attorney, Agent, or Firm* — Hauptman Ham, LLP

(57) ABSTRACT

A clack valve assembly comprising: a valve seat comprising an opening; a bearing comprising a recess with a base, a mouth, and a pair of side walls between the base and the mouth; a lid comprising a lid plate and a shaft, the shaft being received in the recess of the bearing; and a shaft retaining member which closes the mouth of the recess in the bearing, thus retaining the shaft within the recess. The shaft and the lid plate are integrally formed elements of a single part. The shaft can rotate within the recess to enable the lid to rotate from a closed position in which the lid engages the valve seat and covers the opening, to an open position in which the lid lifts away from the valve seat enabling fluid to flow through the opening in the valve seat.

14 Claims, 10 Drawing Sheets

(56) References Cited

U.S. PATENT DOCUMENTS

| | | | | |
|---|---|---|---|---|
| 2,282,532 | A * | 5/1942 | Shenk | F16K 15/03 137/527.4 |
| 2,918,934 | A * | 12/1959 | Wheatley | 137/527.2 |
| 4,508,139 | A * | 4/1985 | Teumer | 137/315.33 |
| 5,236,007 | A * | 8/1993 | Scaramucci | 137/454.2 |
| 5,251,657 | A * | 10/1993 | Scaramucci | 137/315.33 |
| 6,164,324 | A * | 12/2000 | Gradle | 137/554 |
| 6,736,354 | B2 * | 5/2004 | Goto | B64D 37/08 137/572 |
| 6,789,568 | B1 * | 9/2004 | Bunnell | B60K 15/03 137/265 |
| 6,823,905 | B1 * | 11/2004 | Smith | B60P 7/065 137/522 |
| 6,962,324 | B2 | 11/2005 | Bunn et al. | |
| 2009/0056818 | A1 | 3/2009 | McGonigle et al. | |
| 2010/0313972 | A1 | 12/2010 | Paulin et al. | |

FOREIGN PATENT DOCUMENTS

| | | |
|---|---|---|
| EP | 2034224 A2 | 3/2009 |
| GB | 532264 A | 1/1941 |
| GB | 563086 A | 7/1944 |
| GB | 1397393 A | 6/1975 |
| GB | 2338749 A | 12/1999 |
| WO | 2011012581 A1 | 2/2011 |

OTHER PUBLICATIONS

Extended European Search Report for EP 12 19 1642 completed Feb. 27, 2013.

Search Report corresponding to GB 1119491.7, dated Dec. 17, 2011.

Office Communication from EP Application No. 12 191 642.3 dated Sep. 8, 2014.

* cited by examiner

CLACK VALVE ASSEMBLY

RELATED APPLICATIONS

The present application is based on, and claims priority from, British Application Number 1119491.7, filed Nov. 11, 2011, the disclosure of which is hereby incorporated by reference herein in its entirety.

FIELD OF THE INVENTION

The present invention relates to a clack valve assembly and a method of assembling a clack valve assembly.

BACKGROUND OF THE INVENTION

Clack valves (also known as check valves or flapper valves) are commonly used in aircraft fuel systems to control the flow of fuel between different compartments within the fuel system. A clack valve may, for example, be mounted to a rib or another wall separating two compartments of a fuel system in an aircraft wing to control the flow of fuel between the two compartments, and in particular to allow fuel to flow in one direction between the two compartments but not in the other direction.

A clack value may be designed and installed in an aircraft fuel tank such that, under positive G flight conditions, fuel can flow from a fuel tank into a collector box through the clack valve assembly, but not flow back out through it. Such an arrangement helps to ensure adequate fuel flow to the collector box under all engine feeding conditions, including gravity feed and when the quantity of fuel in the tank is low.

It is desirable to minimise the part count of clack valves in order to reduce cost, complexity, weight and assembly time and provide a rugged mechanism.

SUMMARY OF THE INVENTION

A first aspect of the invention provides a clack valve assembly comprising: a valve seat comprising an opening; a bearing comprising a recess with a base, a mouth, and a pair of side walls between the base and the mouth; a lid comprising a lid plate and a shaft, the shaft being received in the recess of the bearing; and a shaft retaining member which closes the mouth of the recess in the bearing, thus retaining the shaft within the recess. The shaft and the lid plate are integrally formed elements of a single part. The shaft can rotate within the recess to enable the lid to rotate from a closed position in which the lid engages the valve seat and covers the opening, to an open position in which the lid lifts away from the valve seat enabling fluid to flow through the opening in the valve seat.

A second aspect of the invention provides a method of assembling a clack valve assembly according to the first aspect, the method comprising: inserting the shaft into the recess through the mouth of the recess; and then closing the mouth of the recess in the bearing with the retaining member, thus retaining the shaft within the recess.

The shaft and the lid plate are integrally formed elements of a single part, which minimises part count compared with an alternative arrangement in which the shaft and lid plate are formed as separate parts.

The shaft and lid plate may be integrally formed elements of a single metallic part. However this may create an isolated conductor which could cause an electrostatic discharge or electromagnetic hazard, as well as being susceptible to corrosion. Therefore more preferably the shaft and lid plate are integrally formed elements of a single part of non-conductive material, which minimises the risk of electrostatic discharge or electromagnetic hazard, and also minimises corrosion. Typically the shaft and lid plate are integrally formed elements of a single part of polymeric material such as Nylon 66, which may be reinforced with non-conductive fibres such as glass fibres.

The shaft retaining member may comprise a stop feature which engages the lid when the lid opens beyond a stop angle to hinder the lid from opening beyond the stop angle.

The clack valve assembly may comprise a first stop feature which engages the lid when the lid opens to a first stop angle to hinder the lid from opening beyond the first stop angle; and the shaft retaining member may comprise a second stop feature which engages the lid if the first stop feature fails to prevent the lid from opening beyond the first stop angle and reaches a second stop angle at which the second stop feature engages the lid and hinders the lid from opening beyond the second stop angle. The valve seat and the first stop feature may be integrally formed parts of a valve body member.

The valve seat and the bearing may be integrally formed parts of a valve body member. The shaft retaining member may be attached to the valve body member by removable fasteners. The valve body member may be attached to a wall by removable fasteners. Some or all of the fasteners used to attach the valve body member to the wall may also be used to attach the shaft retaining member to the valve body member to minimise the part count.

The lid body may comprise a lid plate and a pair of lid arms extending from the lid plate, and the shaft may extend between the lid arms. The shaft, the lid plate and the lid arms may be integrally formed elements of a single part.

The bearing may comprise a first bearing member and a second bearing member, each bearing member comprising a recess with a base, a mouth, and a pair of side walls between the base and the opening. The shaft may be received in the recesses of the first and second bearing members, and the shaft retaining member may close the mouths of the recesses in the bearing members, thus retaining the shaft within the recesses, so that the shaft can rotate within the recesses to enable the lid to rotate from a closed position in which it engages the valve seat to an open position in which it lifts away from the valve seat enabling fluid to flow through the opening in the valve seat.

The lid plate may directly engage the valve seat, or more preferably the lid comprises a resilient sealing member which is attached to the lid plate and engages the valve seat when the lid is in its closed position. The sealing member may comprise a plate which covers the opening along with the lid plate, or it may be an O-ring or similar which does not cover the opening but rather just provides an annular seal against the valve seat.

The base of the recess is preferably curved, typically with a constant radius of curvature.

The clack valve assembly may be installed on a wall separating two regions, and may be used to control the flow of fluid between the two regions. The wall may be a wall of a fuel system, or may be a wall separating any two bodies of fluid.

The clack valve assembly may be installed in a fuel system, for example in a wall or a rib separating two adjacent fuel compartments or a wall of a collector box.

The clack valve assembly may be used to control fluid flow between two compartments in an aircraft fuel system, for example flow between two adjacent fuel tank bays or flow into and out of a collector box for supplying fuel to an engine under negative g flight conditions, or may generally be mounted to any wall separating two bodies of fluid to control flow between the two bodies.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
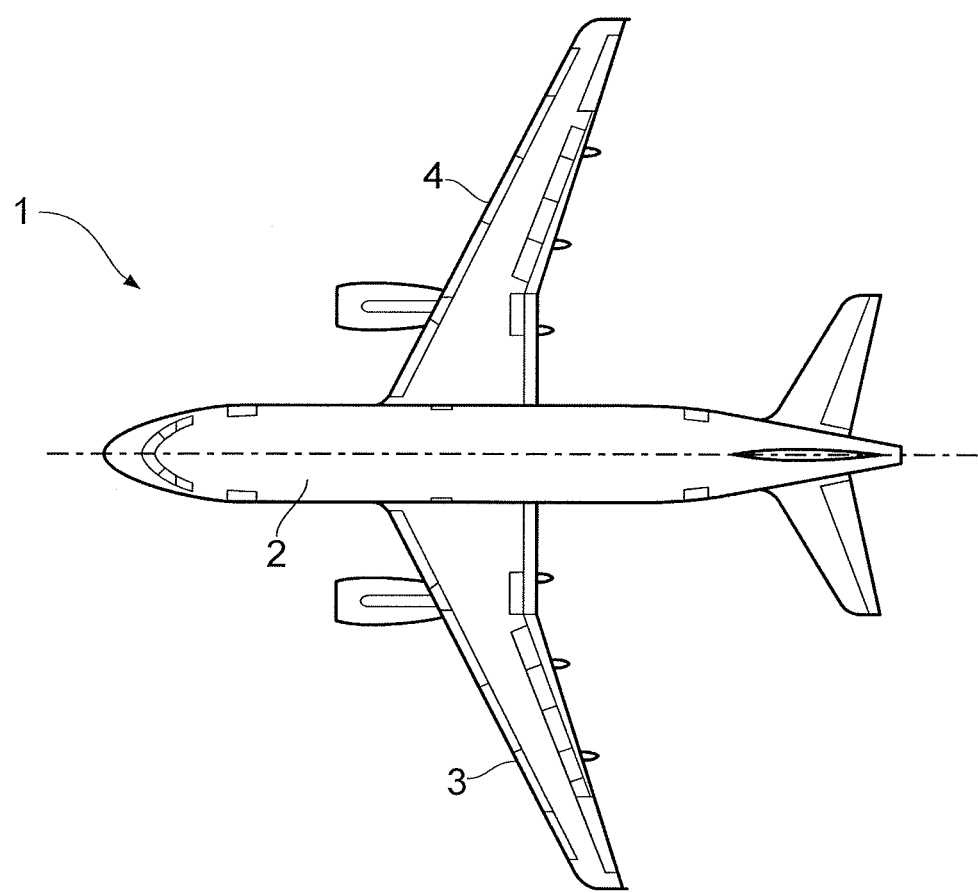
FIG. 1 illustrates an aircraft.
Figure 2:
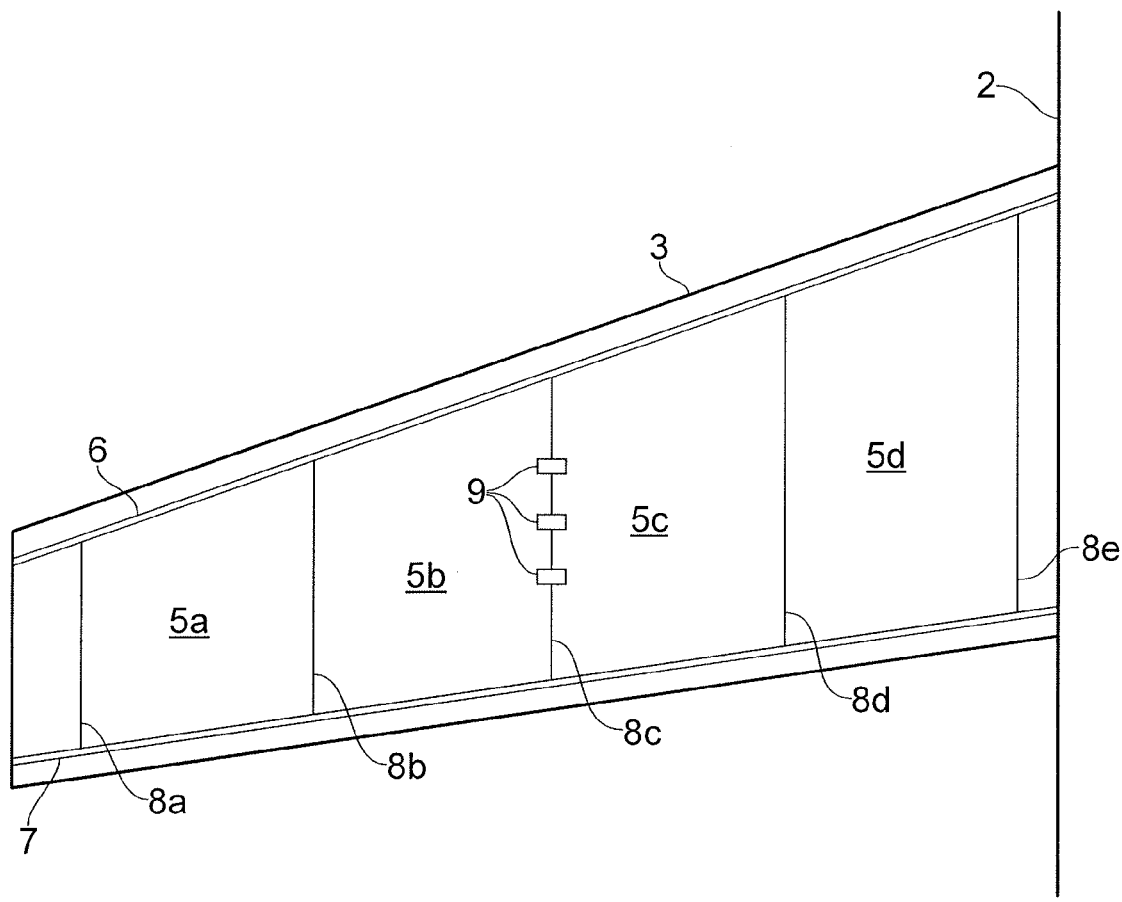
FIG. 2 illustrates the layout of an aircraft fuel tank.

FIG. 1 illustrates a plan view of an aircraft 1 having a fuselage 2 and wings 3, 4. The aircraft 1 has a fuel tank located in the wing 3. The wing has front and rear spars 6, 7 which form front and rear walls of the fuel tank, as indicated in FIG. 2, while upper and lower covers of the wing form the top and bottom walls.

Figure 3:
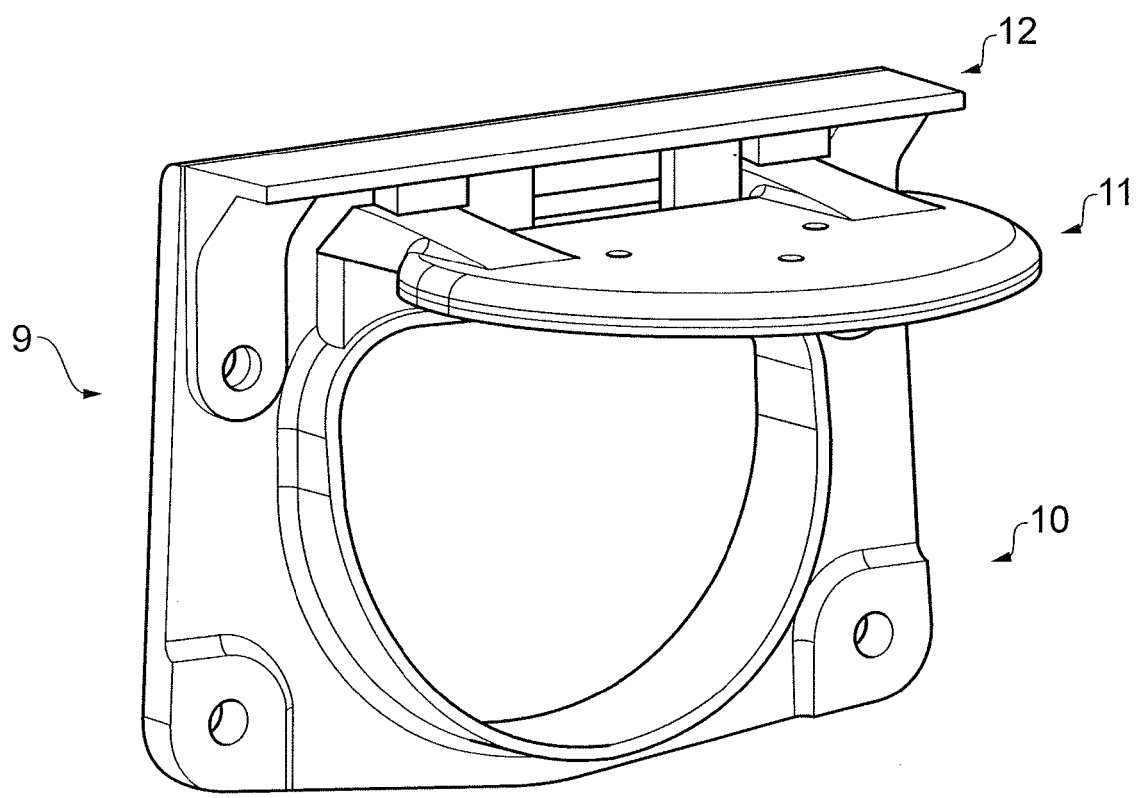
FIG. 3 illustrates an open clack valve assembly in accordance with an embodiment of the invention.

The fuel tank is divided into a plurality of compartments 5a-5d by ribs 8a-8e which run between the front and rear spars 6, 7 and between the upper and lower covers. The rib 8c has several clack valve assemblies 9 installed along its length to control the flow of fuel between fuel tank compartments 5b and 5c. FIG. 3 illustrates the clack valve assembly 9. The assembly comprises three components: a valve base member 10 shown in FIG. 4, a lid assembly 11 shown in FIG. 5, and a retaining member 12 shown in FIG. 6.

Figure 4:
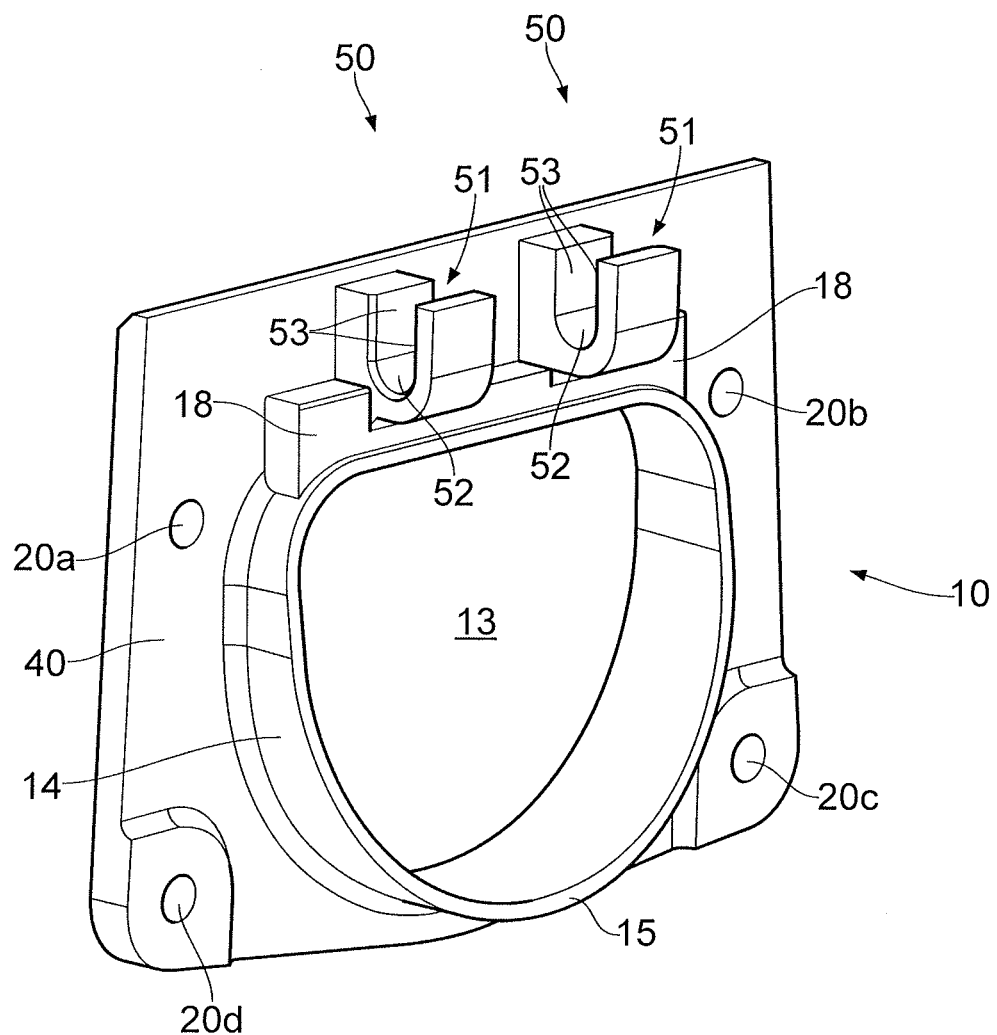
FIG. 4 illustrates a valve base.

Referring to FIG. 4; the valve base member 10 comprises a base plate 40 with an opening 13 surrounded by a flange 14 with an annular end face 15. The opening 13 is aligned with a corresponding opening (not shown) in the rib 8c. Above the opening 13, the valve base member 10 has two bearing members 50 which project from the base plate 40. Each bearing member 50 has a recess with an open mouth 51, a semi cylindrical base 52, and a pair of parallel planar vertical side walls 53 between the base 52 and the mouth 51. The valve base member 10 is also provided with first and second stop features 18.

All parts of the valve base member 10 shown in FIG. 4 are integrally formed as a single part (for instance by injection moulding) from a polymer such as Nylon 66.

Figure 5:
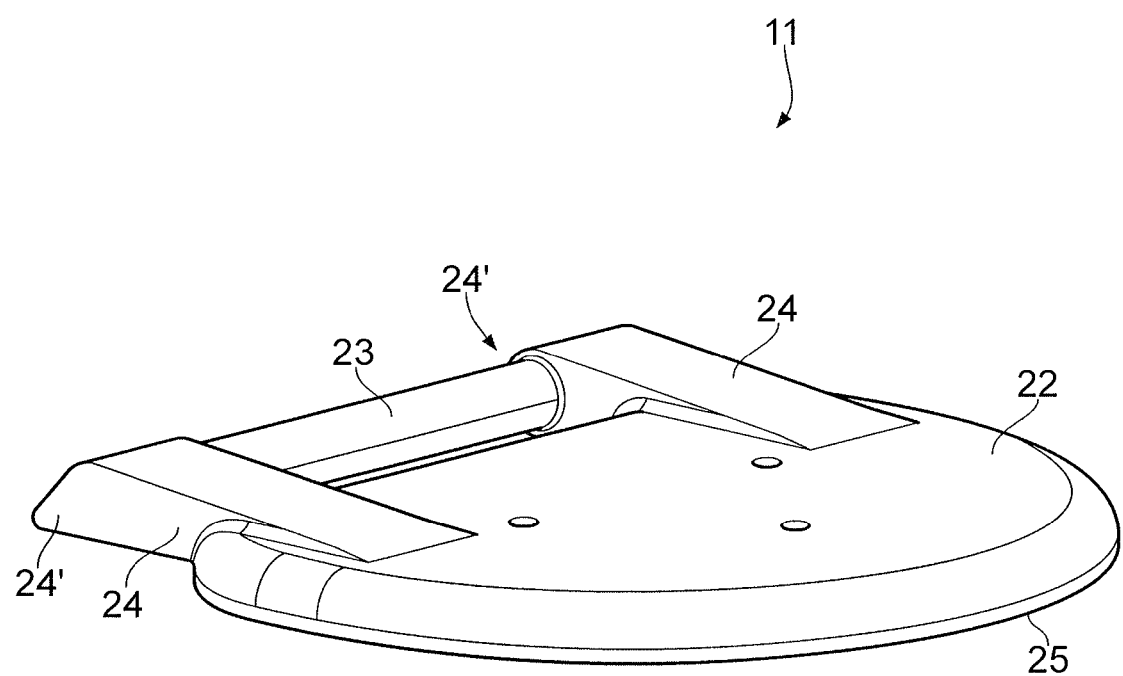
FIG. 5 illustrates a valve lid.
Figure 9:
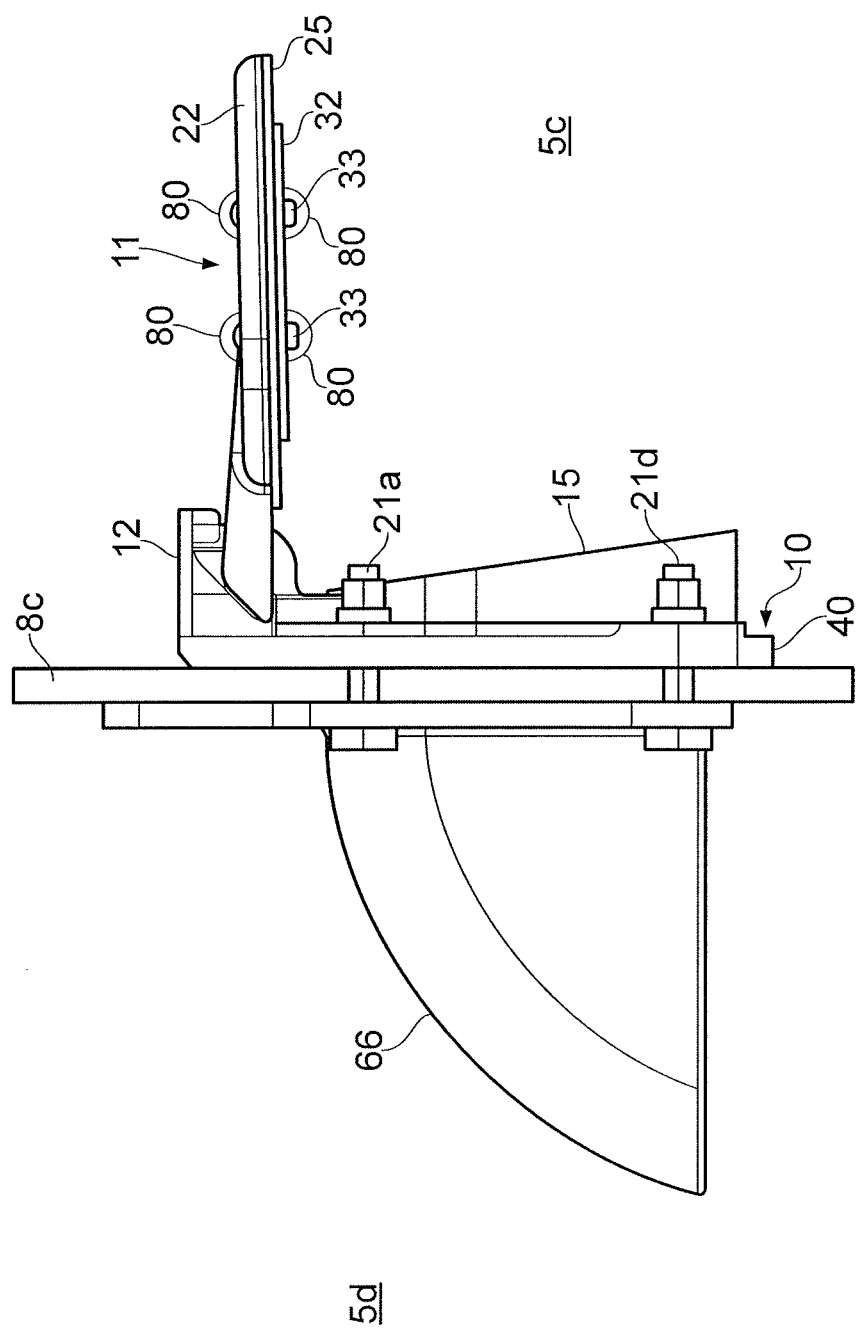
FIG. 9 is a side view of the assembly installed on a rib wall.
Figure 10:
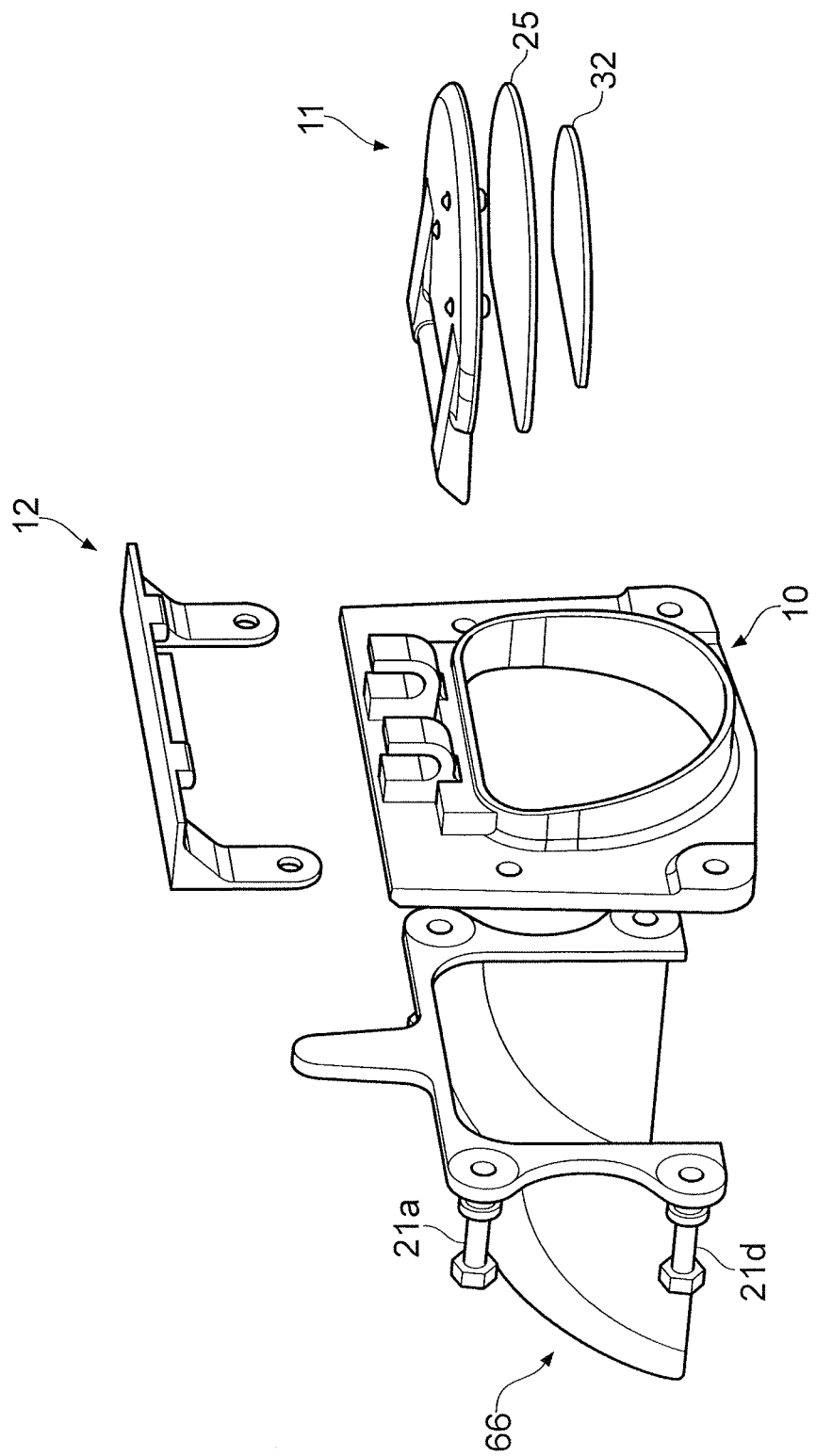
FIG. 10 illustrates a kit of parts for assembling the clack valve assembly.

The lid assembly 11 shown in FIG. 5 comprises a lid plate 22, a shaft 23, a pair of arms 24, a nitrile rubber sealing member 25 and a seal holding plate 32 shown in FIGS. 9 and 10. The lid plate 22, arms 24 and shaft 23 are integrally formed as a single part from a polymeric composite material such as Nylon 66 reinforced with glass fibres. The use of such non-conductive materials minimises the risk of electrostatic discharge or electromagnetic hazard, and also minimises corrosion.

Referring to FIG. 9: the sealing member 25 is held against the lid plate 22 by the holding plate 32, which is attached to the lid assembly by metal rivets 33 which pass through the lid plate 22, the sealing member 25 and the holding plate 32. The heads of the metal rivets are encapsulated by an over seal material 80 which reduces the isolated conductors exposed to surrounding structures.

Figure 8:
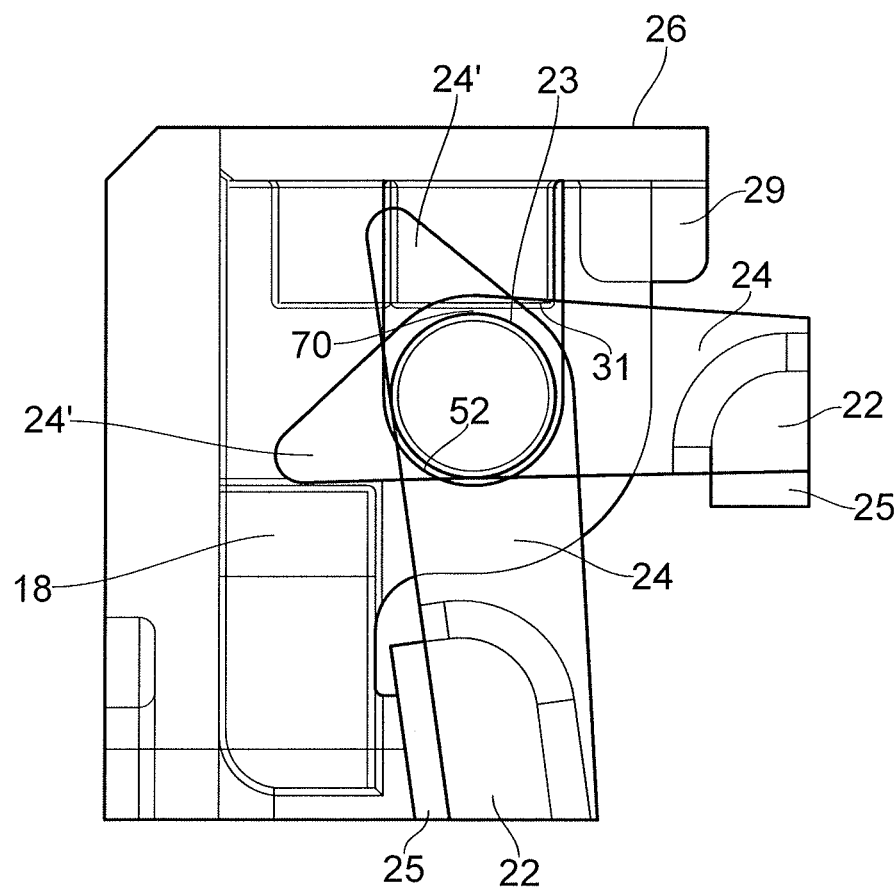
FIG. 8 is a side view, with hidden parts shown, showing the lid in its closed and fully open positions.

The shaft 23 has a circular cross section as shown in FIG. 8 and is seated on the semi cylindrical bases 52 of the recesses 51 in the bearing members 50. The lid assembly 11 can, therefore, pivot relative to the valve base member 10 about the longitudinal axis of the shaft 23.

Figure 7:
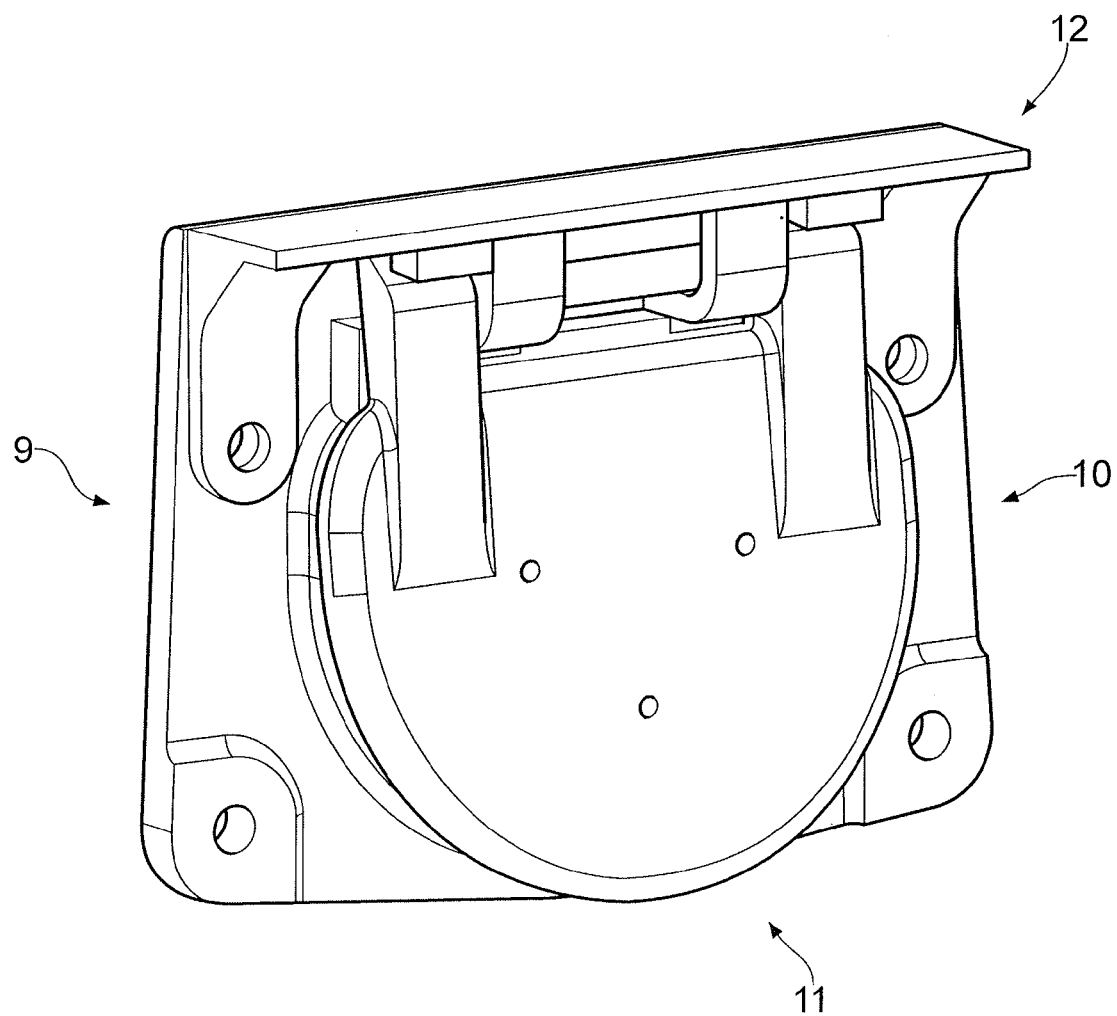
FIG. 7 illustrates a closed clack valve assembly.

The lid assembly 11 can pivot between a closed position shown in FIG. 7 in which the sealing member 25 engages the end face 15 of the valve seat, thereby preventing fluid flow through the opening, and an open position shown in FIG. 3, in which the lid lifts away from the valve seat enabling fluid to flow through the opening. In the closed position the sealing member 25 engages the end face 15 of the flange 14 so that the end face 15 acts as a valve seat. When the lid assembly is in its closed position, the lid plate 22 and the sealing member 25 both cover the opening 13. Both the lid plate 22 and the sealing member 25 have a greater area than the opening 13, when viewed perpendicular to the opening 13.

The plane of the end face 15 lies at an acute angle to the vertical plane of the base plate 40 as shown in FIG. 9. This ensures that the lid assembly 11 remains closed when installed in a dihedral wing.

Figure 6:
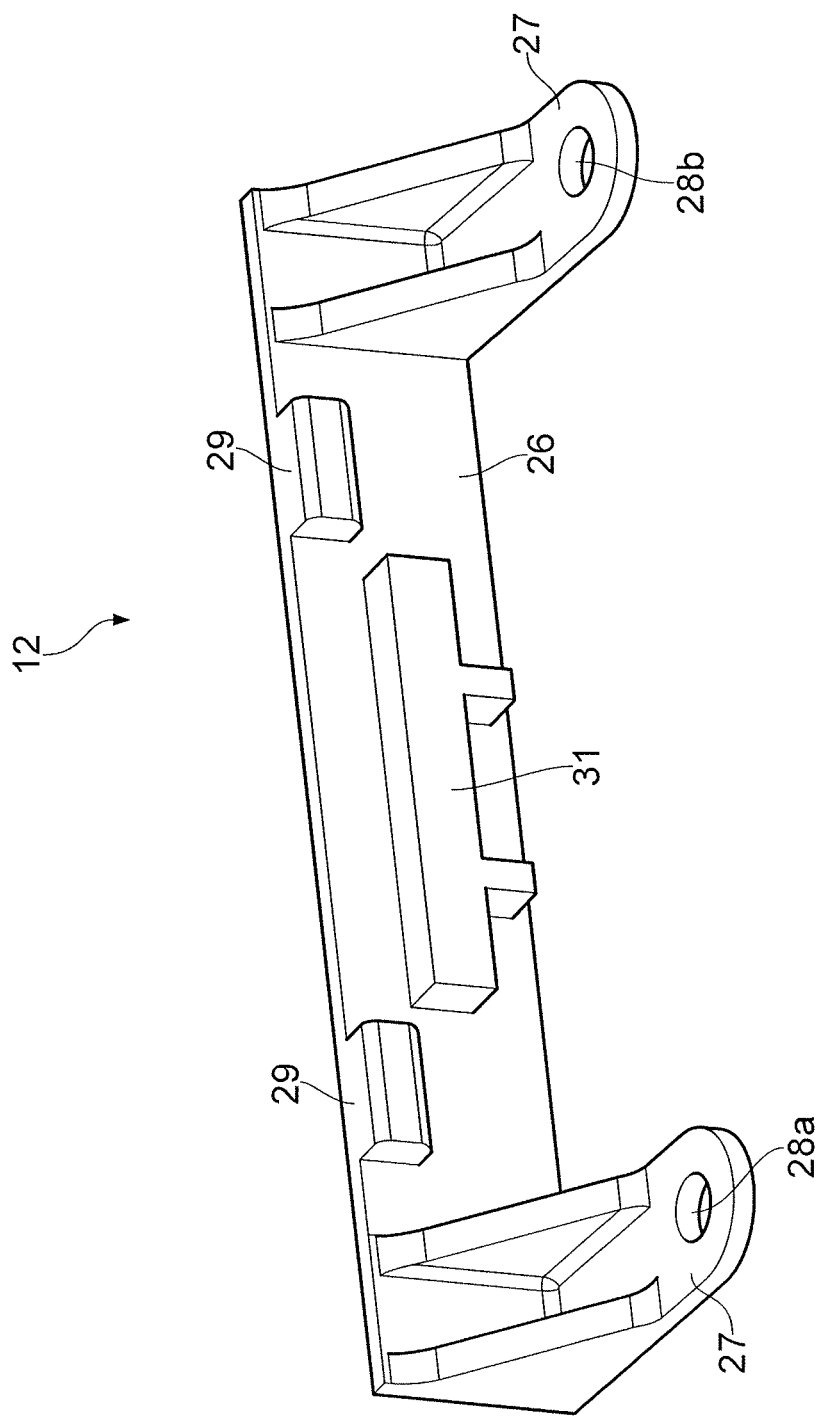
FIG. 6 illustrates a shaft retaining member.

The retaining member 12 shown in FIG. 6 comprises a top plate 26; two location arms 27 with bolt holes 28a and 28b; two stop features 29; and a retaining element 31. All parts of the retaining member 12 shown in FIG. 6 are integrally formed as a single part from a polymer such as Nylon 66 reinforced with glass fibres.

Referring to FIG. 9: the base plate 40 is attached to the rib 8c on the side of the rib 8c facing the compartment 5c by bolts (21a and 21d shown) passing through holes 20a-20d in the base plate 40. The bolts passing through the holes 20a,20b also pass through the holes 28a,28b in the location arms 27 of the retaining member 12, attaching the retaining member 12 to the base member 10. The lid assembly 11 is mounted on the base member 10 by positioning the shaft 23 within the recesses of the bearing members 50 so that the shaft 23 sits on the semi cylindrical bases 52, fitting the retaining plate member 12; and inserting the bolts.

As shown most clearly in FIG. 8, the top plate 26 of the retaining member closes the mouths 51 of the recesses, thus retaining the shaft 23 within the recesses. The retaining element 31 is also pushed into the recesses, with a small gap 70 between the retaining element 31 and the shaft 23.

By attaching the lid assembly 11 to the valve base member 10 using a shaft, bearing member and retaining member as shown, separate metallic spindles and cotter pins are not required. The cost, complexity, part count and assembly time of the valve assembly 9 are therefore all minimised. Additionally, by forming the lid plate 22, shaft 23 and arms 24 of a non-metallic material, the number of isolated metallic parts in the fuel tank 5 is minimised.

The movement of the lid assembly 11 relative to the valve base member 10 is controlled by the movement of the fuel through the valve assembly 9 and the pressure exerted on the faces of the lid plate 22 by fluids within the fuel tank 5. Fuel flow from compartment 5c towards compartment 5b will generally act to move the valve into its closed position while fuel flow through the opening 13 from compartment 5b into compartment 5c will generally act to keep the valve open.

The lid rotates 83° about the axis of the shaft when moving between its closed position and its position of maximum opening. FIG. 8 shows the lid in its closed position and its fully open position. Each arm has a protrusion 24' which extends beyond the shaft 23. The lid assembly 11 is prevented from rotating beyond a primary stop angle of about 83° by engagement of the protrusions 24' with the stop features 18 as shown in FIG. 8, which thus act as a primary stop mechanism.

The valve assembly also has a redundant stop mechanism in the form of the stop features 29 on the retaining member 12. If the primary stop mechanism fails and permits the lid assembly to rotate beyond the primary stop angle shown in FIG. 8, then the stop features 29 engage with the arms 24 to prevent continued rotation beyond a secondary stop angle of about 90°.

A metallic hood 60 shown in FIGS. 9 and 10 is attached to the rib 8c on the opposite side to the valve base 10 by the bolts 21a,21d etc. The hood 60 acts to channel fuel from compartment 5b through the valve assembly under negative g conditions. The hood 60 is bonded back to the rib 8c and the bolts 21a, 21d are bonded back to the hood 60 to minimise the risk of electrostatic discharge.

Although the invention has been described above with reference to one or more preferred embodiments, it will be appreciated that various changes or modifications may be made without departing from the scope of the invention as defined in the appended claims.

The invention claimed is:

1. A clack valve assembly, comprising:
   a. a valve base member having a base plate and a valve seat comprising an opening, wherein the base plate includes an attachment surface;
   b. a bearing comprising a recess with a base, a mouth, and a pair of side walls between the base and the mouth;
   c. a lid comprising a lid plate and a shaft, the shaft being received in the recess of the bearing, wherein the shaft and the lid plate are integrally formed elements of a single part; and
   d. a shaft retaining member which is placed over the mouth of the recess to close the mouth of the recess in the bearing and is attached to the attachment surface of said base plate of the valve base member, thus retaining the shaft within the recess, wherein said shaft retaining member is disposed between said attachment surface of said base plate and said lid plate,
   wherein the shaft can rotate within the recess to enable the lid to rotate from a closed position in which the lid engages the valve seat and covers the opening, to an open position in which the lid lifts away from the valve seat enabling fluid to flow through the opening in the valve seat, and wherein the shaft retaining member comprises a stop feature which engages the lid when the lid opens beyond a stop angle to hinder the lid from opening beyond the stop angle.

2. A clack valve assembly, comprising:
   a. a valve base member having a base plate and a valve seat comprising an opening, wherein the base plate includes an attachment surface;
   b. a bearing comprising a recess with a base, a mouth, and a pair of side walls between the base and the mouth;
   c. a lid comprising a lid plate and a shaft, the shaft being received in the recess of the bearing, wherein the shaft and the lid plate are integrally formed elements of a single part; and
   d. a shaft retaining member which is placed over the mouth of the recess to close the mouth of the recess in the bearing and is attached to the attachment surface of said base plate of the valve base member, thus retaining the shaft within the recess, wherein said shaft retaining member is disposed between said attachment surface of said base plate and said lid plate,
   wherein the shaft can rotate within the recess to enable the lid to rotate from a closed position in which the lid engages the valve seat and covers the opening, to an open position in which the lid lifts away from the valve seat enabling fluid to flow through the opening in the valve seat, and wherein the clack valve assembly further comprises a first stop feature which engages the lid when the lid opens to a first stop angle to hinder the lid from opening beyond the first stop angle; and wherein the shaft retaining member comprises a second stop feature which engages the lid if the first stop feature fails to prevent the lid from opening beyond the first stop angle and reaches a second stop angle at which the second stop feature engages the lid and hinders the lid from opening beyond the second stop angle.

3. A clack valve assembly according to claim 2 wherein the valve seat and the first stop feature are integrally formed elements of a valve body member.

4. A clack valve assembly comprising:
   a. a valve base member having a base plate having a first side and an opposing second side, and a valve seat comprising an opening, wherein the base plate includes an attachment surface, and wherein the valve seat is on the opposing second side of the base plate as the attachment surface;
   b. a bearing comprising a recess with a base, a mouth, and a pair of side walls between the base and the mouth;
   c. a lid comprising a lid plate and a shaft, the shaft being received in the recess of the bearing, wherein the shaft and the lid plate are integrally formed elements of a single part; and
   d. a shaft retaining member which is placed over the mouth of the recess to close the mouth of the recess in the bearing and is secured to the attachment surface of said base plate of the valve base member, thus retaining the shaft within the recess, wherein said shaft retaining member is disposed between said attachment surface of said base plate and said lid plate,
   wherein the shaft can rotate within the recess to enable the lid to rotate from a closed position in which the lid engages the valve seat and covers the opening, to an open position in which the lid lifts away from the valve seat enabling fluid to flow through the opening in the valve seat.

5. A clack valve assembly according to claim 4 wherein the valve seat and the bearing are integrally formed elements of a valve body member.

6. A clack valve assembly according to claim 5 wherein the shaft retaining member is attached to the valve body member by removable fasteners.

7. A clack valve assembly according to claim 4 wherein the shaft and lid plate are integrally formed elements of a single part of polymeric material.

8. A clack valve assembly according to claim 4 wherein the bearing comprises a first bearing member and a second bearing member, each bearing member comprising a recess with a base, a mouth, and a pair of side walls between the base and the opening; the lid comprises a lid plate and a pair of lid arms extending from the lid plate; the shaft extends between the lid arms; the shaft, the lid plate and the lid arms are integrally formed elements of a single part; the shaft is received in the recesses of the first and second bearing members; and the shaft retaining member closes the mouths of the recesses in the bearing members, thus retaining the shaft within the recesses, wherein the shaft can rotate within the recesses to enable the lid to rotate from a closed position in which it engages the valve seat to an open position in which it lifts away from the valve seat enabling fluid to flow through the opening in the valve seat.

9. A clack valve assembly according to claim 4 wherein the lid comprises a resilient sealing member which is attached to the lid plate and which engages the valve seat when the lid is in its closed position.

10. A clack valve assembly according to claim 4 wherein the base of the recess is curved.

11. A clack valve assembly according to claim 4 wherein the lid plate covers the opening when the lid is in its closed position.

12. A fuel system comprising a clack valve assembly according to claim 4.

13. An aircraft comprising a fuel system according to claim 12.

14. A method of assembling a clack valve assembly according to claim 4, the method comprising:
   a. inserting the shaft into the recess through the mouth of the recess; and
   b. after step a., closing the mouth of the recess in the bearing with the retaining member, thus retaining the shaft within the recess.

\* \* \* \* \*